(12) United States Patent
Yao et al.

(10) Patent No.: US 7,966,183 B1
(45) Date of Patent: Jun. 21, 2011

(54) MULTIPLYING CONFIDENCE SCORES FOR UTTERANCE VERIFICATION IN A MOBILE TELEPHONE

(75) Inventors: Kaisheng Yao, Plano, TX (US); Lorin Paul Netsch, Allen, TX (US); Vishu Viswanathan, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1082 days.

(21) Appl. No.: 11/744,616

(22) Filed: May 4, 2007

Related U.S. Application Data

(60) Provisional application No. 60/746,449, filed on May 4, 2006.

(51) Int. Cl.
*G10L 15/04* (2006.01)

(52) U.S. Cl. ........ 704/251; 704/231; 704/236; 704/246; 704/252

(58) Field of Classification Search ............... None
See application file for complete search history.

(56) References Cited

U.S. PATENT DOCUMENTS

| | | | | |
|---|---|---|---|---|
| 4,837,831 | A * | 6/1989 | Gillick et al. | 704/245 |
| 5,710,866 | A * | 1/1998 | Alleva et al. | 704/256.4 |
| 6,260,011 | B1 * | 7/2001 | Heckerman et al. | 704/235 |
| 6,421,640 | B1 * | 7/2002 | Dolfing et al. | 704/236 |
| 2002/0069058 | A1 * | 6/2002 | Jin et al. | 704/249 |
| 2004/0032933 | A1 * | 2/2004 | Groves et al. | 379/88.01 |
| 2004/0210437 | A1 * | 10/2004 | Baker | 704/251 |
| 2005/0119883 | A1 * | 6/2005 | Miyazaki et al. | 704/231 |
| 2005/0187768 | A1 * | 8/2005 | Godden | 704/238 |
| 2006/0035632 | A1 * | 2/2006 | Sorvari et al. | 455/418 |

* cited by examiner

*Primary Examiner* — Leonard Saint Cyr
(74) *Attorney, Agent, or Firm* — Lawrence J. Bassuk; W. James Brady; Frederick J. Telecky, Jr.

(57) ABSTRACT

Automatic speech recognition verification using a combination of two or more confidence scores based on UV features which reuse computations of the original recognition.

9 Claims, 4 Drawing Sheets

MULTIPLYING CONFIDENCE SCORES FOR UTTERANCE VERIFICATION IN A MOBILE TELEPHONE

CROSS-REFERENCE TO RELATED APPLICATIONS

This application claims priority from provisional Appl. No. 60/746,449, filed May 4, 2006. The following co-assigned, copending applications disclose related subject matter: application Ser. No. 11/196,601, filed Aug. 3, 2005 now pending; application Ser. No. 12/133,197, filed Jun. 4, 2008, now pending; and U.S. Pat. No. 7,584,097, issued Sep. 1, 2009.

BACKGROUND OF THE INVENTION

The present invention relates to digital signal processing, and more particularly to automatic speech recognition.

The last few decades have seen the rising use of hidden Markov models (HMM) in automatic speech recognition (ASR) in various applications, such as hands-free dialing for cellphones. In this case a user orally tells the cellphone to call a name, and the cellphone's ASR recognizes the utterance as a call command plus a name in its telephone directory. Of course, utterance-level verification of the recognized items is a necessary component for such real-world ASR applications. By computing an utterance-level confidence score or confidence measure (CM), an utterance verification (UV) system can measure how well the recognition hypothesis matches the observed utterance data. Utterances whose confidence scores fall below a pre-determined threshold are rejected. Ideally, misrecognized in-vocabulary (IV) and out-of-vocabulary (OOV) phrases would be rejected by the utterance verification mechanism.

Various methods have been proposed for computing confidence measures, and these methods fall into three categories. The first category is based on some predictor features, such as acoustic score per frame and HMM state duration. An ideal predictor feature should provide strong information to separate the correctly recognized utterances from other misrecognition utterances, and the distribution overlap between the two classes should be small. However, so far, none of the predictor features is ideal in this sense.

The other two categories of confidence measures are based on statistical frameworks: a posteriori probability or hypothesis testing. Confidence measures in the category of a posteriori probability use a model to compute a score to normalize the likelihood of a recognition result, so that the normalized likelihood approximates the a posteriori probability of the recognized sequence given the observation sequence.

Confidence measures which are based on hypothesis testing use likelihood ratio testing between one model and its competing model (e.g., an anti-model or a filler model). The framework of hypothesis testing is flexible enough to incorporate a variety of methods, such as discriminative training, that may progressively improve performance of CM computation. For example, see Rahim et al. Discriminative Utterance Verification for Connected Digits Recognition, 5 IEEE Tran. Speech and Audio Processing 266 (May 1997).

Most of the foregoing methods can generate accurate confidence measures. However, for mobile devices, confidence measures face some unique challenges. Mobile devices are portable. They may be used everywhere, but they usually have limited memory and computational resources. Hence, for mobile applications, confidence measures have to be robust to noise distortion, which frequently occurs in real environments. Moreover, they have to be efficiently computed because of restrictions on computational cost. These problems may be addressed in the following two aspects:

At the recognizer level, robustness to noise can be enhanced by introducing more robust model adaptation and speech enhancement methods.

At the verification level, inherent features that are robust to noise distortion may be employed; efficient methods to extract such features may be generated; and better model training methods may be applied.

SUMMARY OF THE INVENTION

The present invention provides utterance verification methods with an accept/reject decision using a product of confidence measures.

BRIEF DESCRIPTION OF THE DRAWINGS

FIGS. 1a-1c are a flowchart and system diagrams.

DESCRIPTION OF THE PREFERRED EMBODIMENTS

1. Overview

Figure 1A:
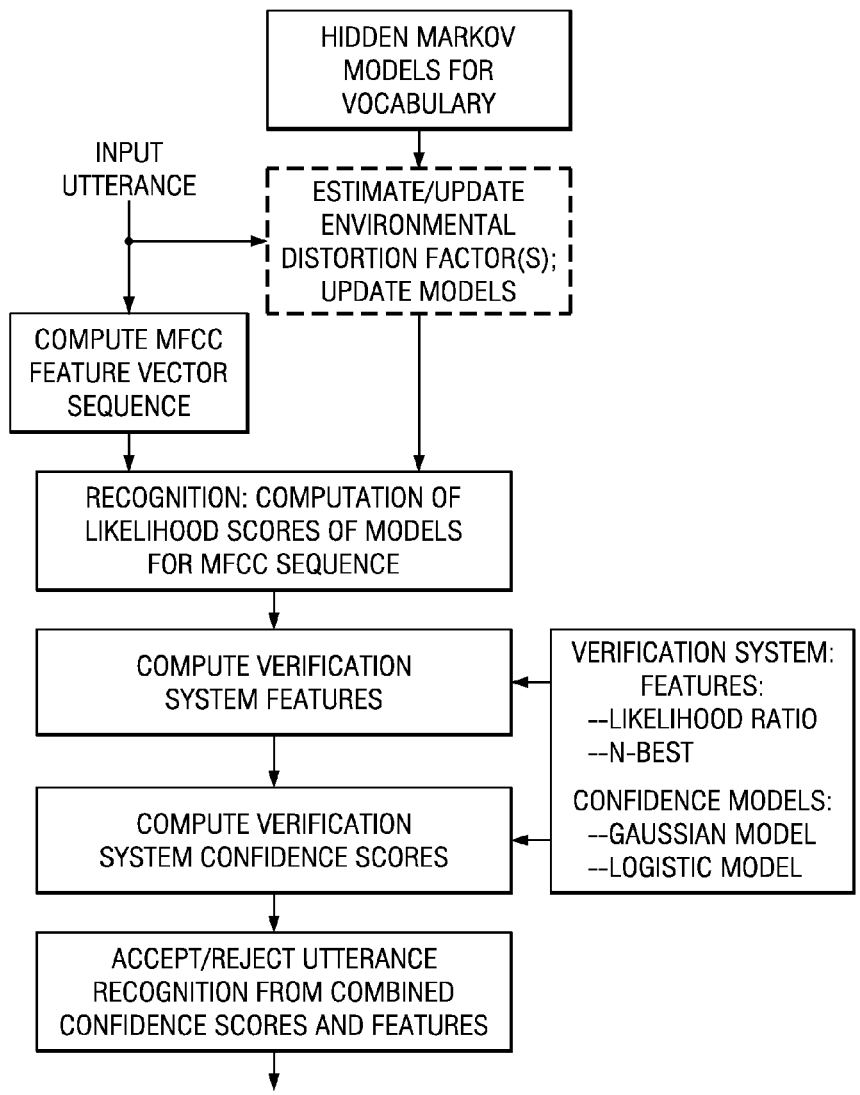
Figure 1B:
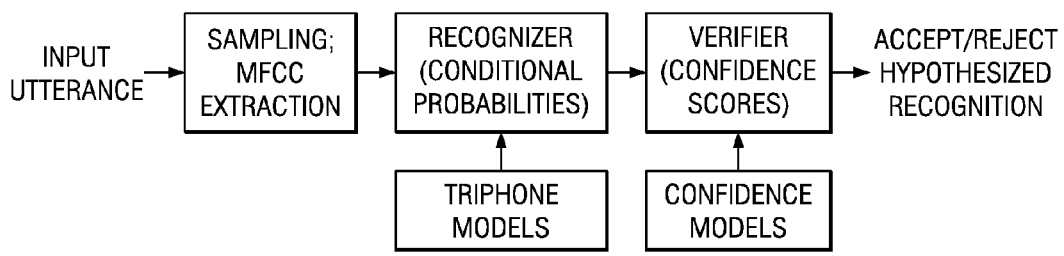

FIG. 1b illustrates the generic approach of an utterance verifier analyzing the output of a recognizer to either accept or reject the hypothesized utterance recognition. The preferred embodiment methods relate to the utterance verification as shown in the lower half of flowchart FIG. 1a.

Preferred embodiment methods include efficient extraction of utterance verification (UV) features to build confidence measurements. One UV feature is a normalized likelihood score that approximates the a posteriori probability of correct recognition given an observation sequence; this reuses computational results from the recognizer. The normalization term is usually obtained using specific models, e.g., a specific anti-model or N-best output from recognition results; however, the preferred embodiment normalization term is the maximum likelihood score that can be obtained during recognition stage. Thereby the preferred embodiment methods avoid explicit evaluation of specific models and thus have low computational costs.

Preferred embodiment methods also provide a final UV confidence score by fusion of two or more confidence scores and also provides for possible bias of the score with further UV features. This enhances system performance.

Preferred embodiment methods further include adaptation of the UV decision model to improve performance during use.

Figure 2A:
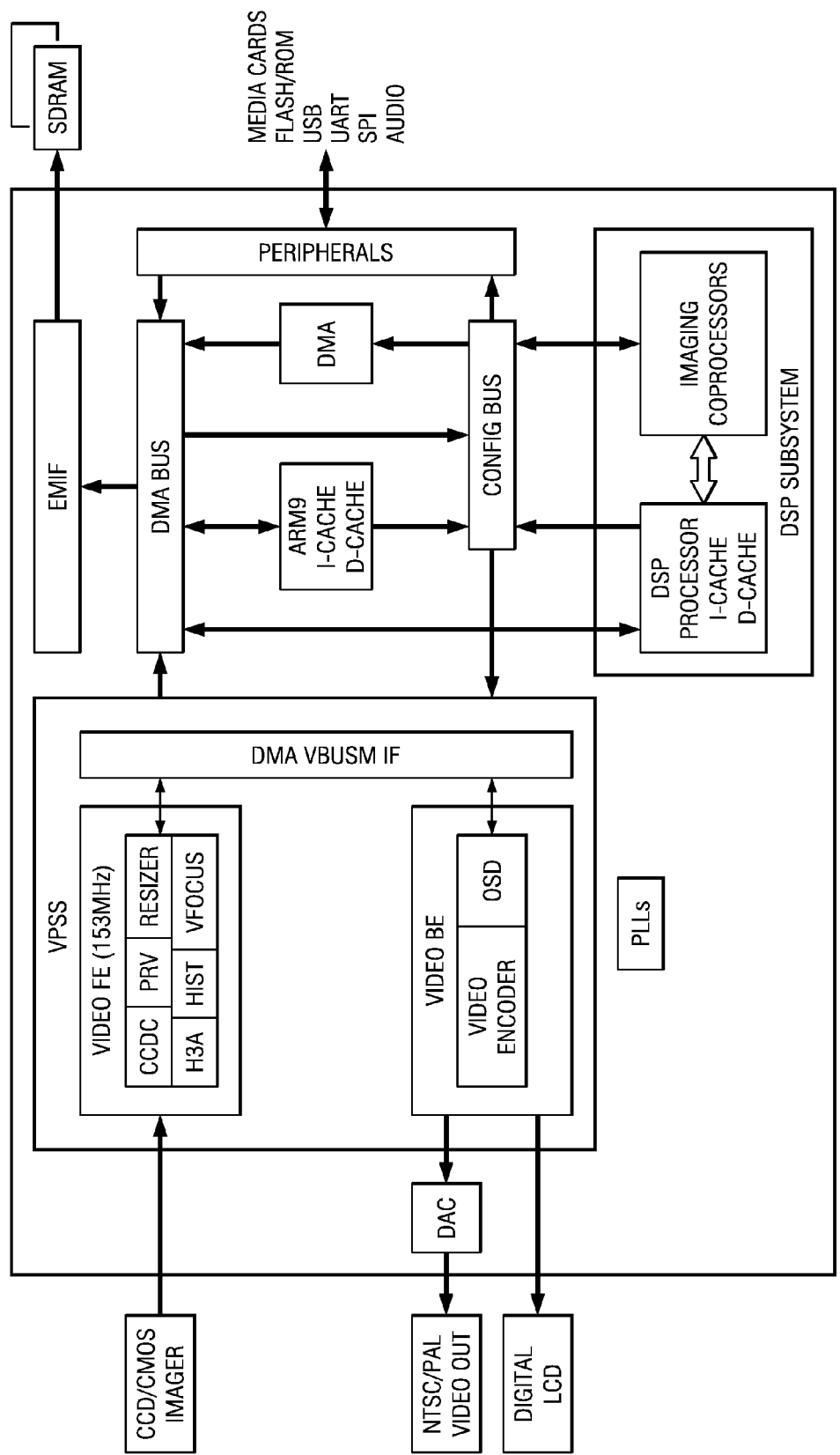
FIGS. 2a-2b illustrate a processor and network connections.
Figure 2B:
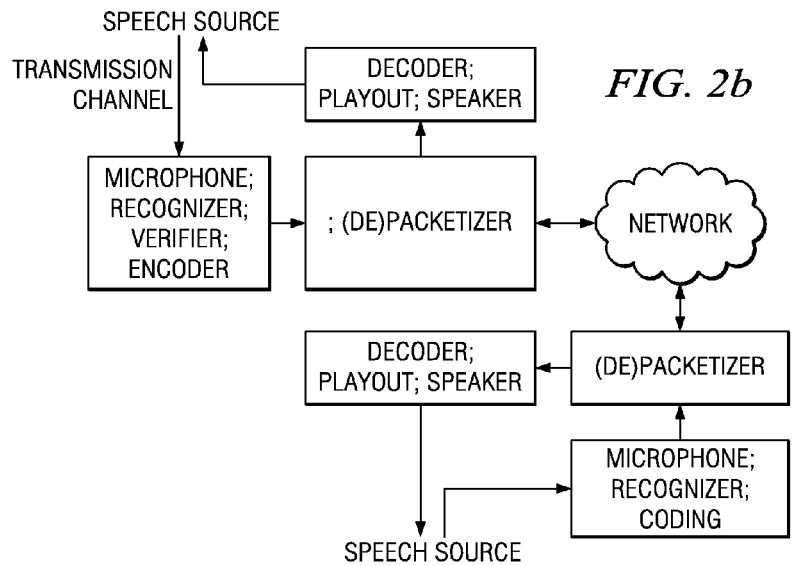

Preferred embodiment systems (cellphones with hands-free dialing, PDAs, etc.) perform preferred embodiment methods with any of several types of hardware: digital signal processors (DSPs), general purpose programmable processors, application specific circuits, or systems on a chip (SoC) which may have multiple processors such as combinations of DSPs, RISC processors, plus various specialized programmable accelerators. FIG. 2a shows functional blocks of an audio/visual processor with video input/output on the left side and audio input/output is on the right side. A stored program in an onboard or external (flash EEP) ROM or FRAM could implement the signal processing. Microphones, audio speakers, analog-to-digital converters, and digital-to-analog converters can provide coupling to the real world, modulators and demodulators (plus antennas for air interfaces) can provide coupling for transmission waveforms, and packetizers can provide formats for transmission over networks such as a cellphone network or the Internet; see FIG. 2b.

2. Recognizer Background

The section provides a brief example HMM recognizer (FIG. 1a top portion; FIG. 1b left portion). Presume triphone acoustic models which could be used for recognition as follows: sample input speech (e.g., at 8 kHz); partition the stream of samples into overlapping (windowed) frames (e.g., 160 samples per frame with ⅔ overlap); apply a fast Fourier transform (e.g., 256-point FFT) to each frame of samples to convert to the spectral domain; compute the spectral energy density in each frame by squared absolute values of the transform; apply a Mel frequency filter bank (e.g., 20 overlapping triangular filters) to the spectral energy density and integrate over each Mel subband to get a 20-component vector in the linear spectral energy domain for each frame; apply a logarithmic compression to convert to the log spectral energy domain; apply a 20-point discrete cosine transform (DCT) to decorrelate the 20-component log spectral vectors to convert to the cepstral domain with Mel frequency cepstral components (MFCC); take the 10 lowest frequency MFCCs as the feature vector for the frame plus, optionally, also include the rate of change (plus acceleration) of each component to give a 20- or 30-component feature vector with the rate of change (and acceleration) computed as differences from prior frames; compare the sequence of MFCC feature vectors for the frames to each of a set of models corresponding to a vocabulary of triphones for recognition; declare recognition of the triphone corresponding to the model with the highest score where the score for a model is the computed probability of observing the sequence of MFCC feature vectors for that model with a Viterbi type of computation; the probability computations use the model state transition probabilities together with the feature vector probability densities of the states (probability densities defined as mixtures of Gaussians allows for simple computations in the log probability domain). Note that the segmentation of the input sequence of MFCC feature vectors into phones is by the successive recognitions of triphones; silence and background noise typically are also represented as models in order to be recognized.

More explicitly, for an acoustic model $\lambda$ with multivariate Gaussian mixture state probability densities, the conditional probability of observing MFCC feature vector $O(t)$ for time (frame) t given the state at time t is equal to q (i.e., $s_t=q$), and the Gaussian mixture coefficient at time t is equal to p (i.e., $m_t=p$) is:

$$P[O(t)|s_t=q, m_t=p, \lambda] = G(O(t), \mu_{q,p}, \sigma_{q,p})$$

where the model $\lambda$ has $\mu_{q,p}$ as the vector of means and $\sigma_{q,p}$ as the vector of standard deviations where the multivariate Gaussian is taken to have a diagonal covariance matrix. The model parameters (state transition probabilities, mixture coefficients, $\mu_{q,p}$, and $\sigma_{q,p}$) are established by training the model on the corresponding triphone. (As indicated by the broken-line box in FIG. 1a, the model parameters may be updated to account for environmental distortion.)

Then using these conditional probabilities, compute the a posteriori probability of $s_t=q$ and $m_t=p$ given the observed feature vector sequence, $O(1), O(2), \ldots O(T)$, such as by the forward-backward method. In particular, define $\alpha_q(t)$ as the forward probability of state q at time t and $\beta_q(t)$ as the corresponding backward probability:

$$\alpha_q(t) = P[O(1) \ldots O(t)|s_t=q, \lambda]$$

$$\beta_q(t) = P[O(t+1) \ldots O(T)|s_t=q, \lambda]$$

Then, including the mixture coefficients gives $$P[s_t = q, m_t = p \mid O(1)\ldots O(T), \lambda]$$
$$= \left[\alpha_q(t)\beta_q(t) \bigg/ \sum_{q^*} \alpha_{q^*}(t)\beta_{q^*}(t)\right]\left[G(O(t), \mu_{q,p}, \sigma_{q,p}) \bigg/ \sum_{p^*} G(O(t), \mu_{q,p^*}, \sigma_{q,p^*})\right]$$

where the divisions by a sum are for normalization.

As previously noted, the recognizer applies the Viterbi algorithm using $\alpha_q(t)$ and $\beta_q(t)$ to find the probabilities of state sequences and eventually find the model probability $P[\lambda|O(1) \ldots O(T)]$. Then the recognizer compares the probabilities computed for the various acoustic models to hypothesize/recognize the triphone corresponding to the model with the highest probability as the phone for that segment of the utterance. Repeating for successive observation segments and phones in the utterance gives the final recognition hypothesis (sequence of phones) for the utterance.

Common alternative approaches use acoustic models of monophones, words, syllables, et cetera instead of triphones. Further, alternative models use feature vectors related to frame LPC coefficients, frame energy, et cetera rather than MFCC vectors.

3. Utterance Verification Feature Vectors

As motivation for the first preferred embodiment method of utterance verification (UV) feature extraction, consider the following. A recognizer applied to utterance u (observation MFCC vector sequence $O^{(u)}$) yields a recognized word or word string (e.g., a recognized sequence of phones $h_1 h_2 \ldots h_M$) together with a D-dimensional real-valued UV vector, $F_x$. That is, $F_x$ is the UV feature vector for a UV system and has D components, each of which is a UV feature:

$$F_x = [f_0, f_1, \ldots, f_{D-1}]$$

For example, the component $f_0$ could be the log-likelihood of the recognized sequence of phones from $O^{(u)}$.

Now assume that the UV feature vector $F_x$ can be classified into one of two hypotheses. One hypothesis, denoted as $H_0$, assumes that the recognition result is correct, and the alternative hypothesis, denoted as $H_1$, assumes that the recognition result is not correct. The problem of utterance verification is to choose a hypothesis given $F_x$.

In the framework of hypothesis testing, the choice (decision) is made by comparing the following log-likelihood ratio of the observation sequence to a threshold.

$$LLR[O^{(u)}] = \log\{P[F_x \mid \Lambda_{H_0}]/P[F_x \mid \Lambda_{H_1}]\}$$
$$= \log\{P[F_x \mid \Lambda_{H_0}]\} - \log\{P[F_x \mid \Lambda_{H_1}]\}$$

where $\Lambda_{H0}$ denotes the UV decision model for $H_0$ and $\Lambda_{H1}$, denotes the UV decision model for $H_1$. When $LLR[O^{(u)}]$ is larger than a (positive) threshold, hypothesis $H_0$ (correct recognition) is accepted; otherwise, $H_0$ is rejected.

Preferred embodiment methods provide reliable, robust, and efficient hypothesis decision making (confidence measures) preferred embodiment methods of extraction of the UV feature vector $F_x$ and of training the decision model parameters for UV decision models $\Lambda_{H0}$ and $\Lambda_{H1}$.

Preferred embodiment UV feature vectors, $F_x$, are extracted only from speech segments, as silence and non-speech segments do not have discriminative information for utterance verification.

First, suppose phone $h_i$ has been hypothesized (recognized) within the observed sequence of acoustic (MFCC) vectors $O_i = \{o_{1,i}, o_{2,i}, o_{3,i}, \ldots, o_{T_i,i}\}$ where $o_{t,i}$ denotes the observation vector at time (frame) t for hypothesized phone $h_i$ and $T_i$ is the number of frames for this phone. Let T denote the total frame count of the speech (non-silence) segments; then $T = \Sigma_{1 \leq i \leq M} T_i$ where M is the number of phones hypothesized (recognized) in the utterance.

(a) Likelihood UV Feature

A first confidence measure (UV feature) for a recognized phone sequence is based on a posteriori probability of the hypothesized phone sequence $[h_1 \ldots h_M]$ given observation sequence O $$f_0 = \log\{P\{[h_1 \ldots h_M] | O\}\}.$$

Assuming independence at the phone level, the above a posteriori probability can be written as:

$$f_0 = \Sigma_{1 \leq i \leq M} \log\{P[h_i | O_i]\}$$

where $P[h_i | O_i]$ is the a posteriori probability of phone $h_i$ given the utterance portion $O_i$ recognized as $h_i$. This $f_0$ is the first component of the foregoing preferred embodiment UV feature vector $F_x$.

Rewriting in terms of the probability of the observations given the hypothesized phone:

$$\log\{P[h_i | O_i]\} = \log\{P[O_i | h_i] P[h_i] / P[O_i]\} \quad (1)$$
$$= \log\{P[O_i | h_i]\} - \log\{P[O_i]\} + \log\{P[h_i]\}$$

The above a posteriori probability requires computations of the following probabilities.

The probability of observing $O_i$ given phone $h_i$, $P[O_i|h_i]$, can be computed by the forward probability $\alpha_q(t) = P[O_i | s_{t=T_i} = q, h_i]$, with q substituted with the last state of phone $h_i$.

Typically, $P[O_i]$ is computed by summing over all phones $\{h_1, \ldots, h_W\}$. Notice that the hypothesized phones $\{h_1, \ldots, h_M\}$ are a subset of all phones. That is, the typical computation is:

$$P[O_i] = \Sigma_{1 \leq m \leq W} P[O_i | h_m] P[h_m]$$

which requires evaluation of $P[O_i | s_{t=T_i} = q, h_m]$ with q taken as the last state of phone $h_m$ for each phone $h_m$. The evauulation may use the same procedure to compute the forward probability $\alpha_q(t)$.

However, preferred embodiment methods instead apply the following simplifications. Note that assuming independence at the frame level, the above probability of the observed segment, $O_i$, given each phone can be rewritten in terms of a product of probabilities of observing frames $o_{t,i}$ given the phone:

$$P[O_i | h_m] = \Pi_{1 \leq t \leq T_i} P[O_{t,i} | h_m]$$

Further, assume that each phone occurs equally likely so that the $P[h_m]$ can be ignored, the $P[O_i]$ can then be approximated as $$P[O_i] = \Pi_{1 \leq t \leq T_i} \Sigma_{1 \leq m \leq W} P[o_{t,i} | h_m]. \quad (2)$$

Further replacing the sum with the simpler maximum over phones, the preferred embodiment methods approximates $P[O_i]$ as $$P[O_i] = \Pi_{1 \leq t \leq T_i} \{\max_{1 \leq m \leq W} P[o_{t,i} | h_m]\}.$$

Since all of the conditional probabilities, $P[o_{t,i}|h_m]$, are computed as part of model scoring during the recognition processing of the observation segment $o_{1,i}, o_{2,i}, \ldots, o_{T_i,i}$, this UV feature does not increase computational complexity. That is, in FIG. 1b the pertinent computations of the recognizer are stored and available to the verifier.

Known methods set the probablity $P[h_i]$ to 1, as the phone $h_i$ for evaluating $\log\{P[O_i|h_i]\}$ in Eq. (1). Alternatively, the probability is assumed to be a constant as the approximation done in Eq. (2), and hence can be ignored.

Thus the overall UV feature is:

$$f_0 = \sum_{1 \leq i \leq M} \log\{P[O_i | h_i]\} - \sum_{1 \leq i \leq M} \log\{P[O_i]\}$$
$$= \sum_{1 \leq i \leq M} \log\{P[O_i | h_i]\} - \sum_{1 \leq t \leq T} \max_{1 \leq m \leq W} \log\{P[o_t | h_m]\}.$$

(b) N-Best UV feature

A second confidence measure (UV feature) is based on the intuition that the larger the number of alternative recognized phone sequences, the lower the confidence in a recognized utterance. This intuition is based on an observation that, when an utterance is difficult to be recognized, for instance a name uttered in a car driven on a highway, a recognition system usually presents as many outputs (recognition hypotheses) as possible. In contrast, when a name is easy to be recognized, for instance, a name uttered in a quiet office, the recognition system has only one output and that can also be correct. The many recognition results are also called N-Bests if the probability $P\{O|[h_1 \ldots h_M]\}$ of each hypothesized phone sequence $[h_1 \ldots h_M]$ is ranked.

The N-Bests are computed as part of the recognition computations. In particular, the recognizer applied to an input MFCC vector observation sequence O computes probabilities for hypothesized sequences of phones, and these hypothesized sequences can be ordered according to probability. That is, the recognizer evaluates the recognized hypothesis of $h_{1,1}, h_{1,2}, h_{1,3}, \ldots, h_{1,M}$, as $P\{O|[h_{1,1} \ldots h_{1,M}]\}$. Similarly, alternative hypotheses were also evaluated during the recognition: for hypothesis $h_{k,1}, h_{k,2}, h_{k,3}, \ldots, h_{k,M}$, the output would be $P\{O|[h_{k,1} \ldots h_{k,M}]\}$. Notice that if an utterance is easy to be recognized, its correspondingly correct phone sequence can have a much larger probability than those of the alternative hypotheses. Hence, using a pruning procedure with a pruning threshold can eliminate those hypotheses with lower probabilities. Given the pruning threshold, the number of the kept hypotheses can vary significantly. The pruning threshold is typically applied at each frame, so it needs to be carefully selected to keep the correct phone sequence from being eliminated during the recognition process.

From the N-Bests methodology, a preferred embodiment defines an N-Bests UV feature as $$f_1 = 0 \text{ when number of } N\text{-Bests is at most } N$$
$$= \xi \text{ otherwise}$$

where N is a positive integer (which would vary with vocabulary size) and $\xi$ is a corresponding empirically determined negative number. One preferred embodiment takes N=20 and $\xi=-50$.

4. Fused Confidence Scores

The preferred embodiment methods fuse two or more separate confidence scores for a UV model to obtain a final confidence score. Thus this section considers two confidence scores plus a fusion. The first confidence score is generated for each utterance based on Gaussian UV modeling. Denote a UV feature for utterance u as $f_0(u)$; for example, the $f_0$ of the preceding section. The UV feature value is assigned to one of two sets, $S_c$ and $S_e$ ("correct" and "error"): $S_c$ consists of the UV feature values, $f_0(u)$, that are generated when the utterances, u, are correctly recognized, and $S_e$ consists of the UV feature values when the utterances are misrecognized.

For sets $S_c$ and $S_e$ compute means $\mu_c$ and $\mu_e$ plus deviations $\sigma_c$ and $\sigma_e$, respectively, using the $f_0(u)$ for a set of training utterances. The utterance verification models now consists of two Gaussian densities, $\Lambda_c = G(; \mu_c, \sigma_c)$ and $\Lambda_e = G(; \mu_e, \sigma_e)$.

A first confidence score of an input utterance u is computed using the UV feature $f_0(u)$ in a log-likelihood ratio:

$$Scr_1(u) = \log\{G(f_0(u); \mu_c, \sigma_c) / G(f_0(u); \mu_e, \sigma_e)\}$$
$$= 1/2[-\log \sigma_c^2 - (f_0(u) - \mu_c)^2 / \sigma_c^2 + \log \sigma_e^2 + (f_0(u) - \mu_e)^2 / \sigma_e^2]$$

A second confidence score of the input utterance u is computed using the UV feature $f_0(u)$ with logistic modeling. The model is trained by labeling each UV feature value $f_0(u)$ for u in the set $S_c$ as 1, and each UV feature value $f_0(u)$ for u in set $S_e$ as 0. The model approximates the logistic labeling by $$Scr_2(u) = 1/[1+\exp(-w_1-w_2 f_0(u))]$$

where $w_1$ and $w_2$ are the parameters (weights) of the logistic model. Usually, maximum likelihood training is used to learn these model parameters. That is, apply a recognizer to a training set of utterances, $\{u_j\}$, and classify each $u_j$ according to the correctness of the recognition as either in $S_c$ or $S_e$. Also compute the $f_0(u_j)$ and then find $w_1$ and $w_2$ to minimize $$\Sigma_{ui \in Sc} |1 - 1/[1+\exp(-w_1-w_2 f_0(u_i))]|^2$$
$$+ \Sigma_{uj \in Se} |1/[1+\exp(-w_1-w_2 f_0(u_j))]|^2$$

Because 1 was taken as the label for set $S_c$ and 0 for set $S_e$, the score $Scr_2(u)$ can be considered as an approximation to the a posteriori probability of correct recognition of the utterance u.

Confidence scores $Scr_1(u)$ and $Scr_2(u)$ each provide a posteriori probability-like confidence measures of correct recognition of utterance u. The preferred embodiment fuses the two scores by multiplication to give an overall score:

$$Scr(u) = Scr_1(u) Scr_2(u)$$

Empirically, this score can be improved by biasing with the second UV feature value, $f_1(u)$, from the preceding section. The final two-UV-feature decision score is then:

$$Scr(u) = Scr_1(u) Scr_2(u) + f_1(u)$$

FIGS. 1a-1b illustrate a preferred embodiment UV flowchart and system which accepts the utterance u as correctly recognized when Scr(u) is larger than a threshold Th. Otherwise, the UV system rejects the utterance u, declaring that it is misrecognized. Values for Th are selected according to requirements on false acceptance rate and false rejection rate, which will be described in Section 6. Typically, the Th is selected to achieve, for instance, 10% false rejection rate and 30% false acceptance rate, for a name dialing system.

5. Adaptation of the Utterance Verification

The Gaussian modeling for the first confidence score, $Scr_1$ ( ) of section 4 can be adaptive in either a supervised or an un-supervised way. In the supervised way, the UV system has feed-back from the user (or some other sources) that the recognition is correct or incorrect. In the un-supervised way, the UV system relies on its decision using Scr(u). In either way, the following method is used to adapt (update) the Gaussian modeled confidence score $Scr_1$ ( ) after verification of the utterance u:

$$\mu_c \leftarrow a \mu_c + b f_0(u)$$

when u correctly recognized $$\mu_e \leftarrow a \mu_e + b f_0(u)$$

otherwise where b=1-a, and a is typically taken in the range $0.950 \leq a \leq 0.999$.

6. Experimental Results

The preferred embodiment methods were evaluated using the WAVES database which was collected in vehicles using an AKG M2 hands-free distant talking microphone in three recording environments: parked car with engine off; stop-and-go driving; and highway driving. There are 20 speakers in the database. Each speaker has 120 utterances of 90 names. Therefore, the utterances in the database were noisy. Another difficulty was due to multiple pronunciations of names. It is therefore very interesting to see the performance of different compensation algorithms on this database.

Experiments were also conducted in other types of noise, such as TIMIT noise, babble, subway, etc.

Baseline acoustic models in the recognizer are triphone HMMs with mixtures of four Gaussians per state. A Gaussian mixture tying scheme was used to effectively share Gaussian densities. Acoustic models were trained using Phonebook database.

Evaluation of the verification tasks is based on false acceptance rate (FA) of incorrectly recognized units and false rejection rate (FR) of correctly recognized units. The rates are calculated as fractions:

FA=(no. accepted misrecognized utterances)/(no. accepted utterances)

FR=(no. rejected correctly-recognized utterances)/(no. rejected utterances)

When all of accepted utterances were in fact misrecognitions, then the FA rate is 1. The FR is 1 when all of the rejected utterances were correctly recognized. Plots of FA as a function of FR are called receiver operation curve (ROC). They show how a system makes balance between FA and FR.

In addition to the ROC, equal error rate (EER) is also used. It is the number where FA is equal to FR. The lower the EER, the better the system performs.

Two tasks are used to evaluate the system:

(1) Out of vocabulary (OOV) task: Testing utterances for each speaker contain 90 names. The grammar of the recognizer is, however, for 60 names. Hence, 30 names are out-of-vocabulary.

(2) In-vocabulary (IV) task: In this task, all of utterances are in vocabulary, meaning that they have correct grammar.

Results

Using the confidence score Scr(u), EERs in highway, stop-n-go, and parked conditions are respectively 14.44%, 13.88%, and 13.21% for OOV task. For IV task, EERs are 21.67%, 26.92%, 14.29%, respectively in highway, stop-n-go, and parked conditions.

Figure 3:
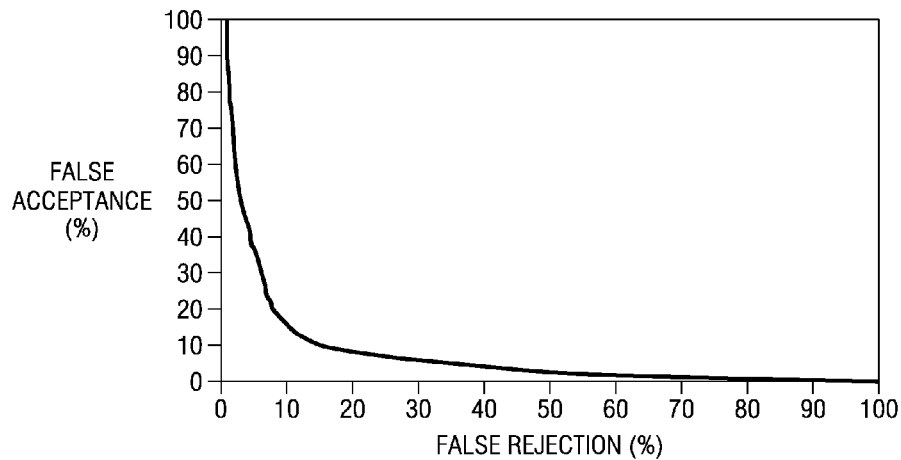
FIGS. 3-6 show experimental results.
Figure 4A:
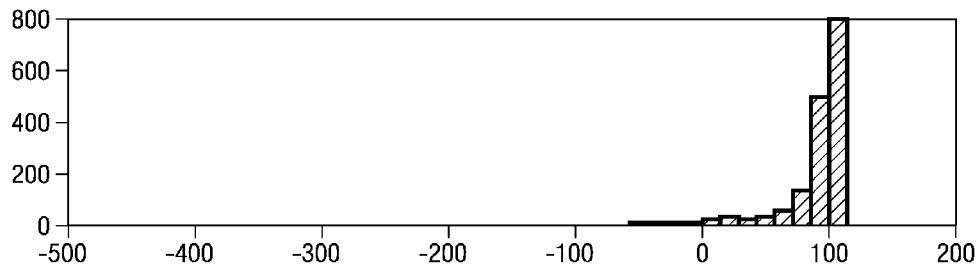
Figure 4B:
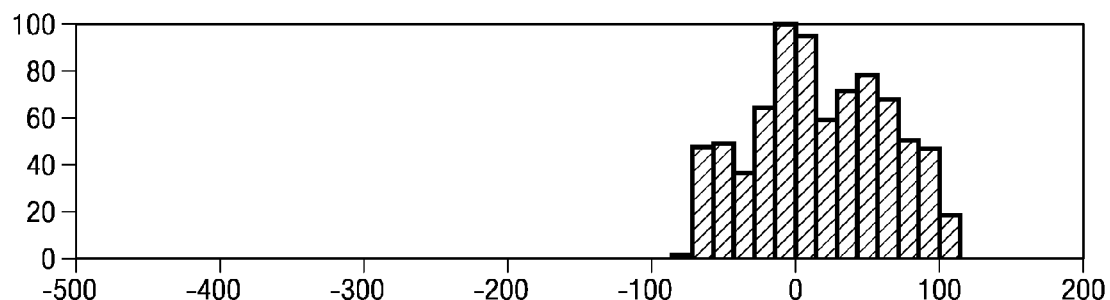
Figure 5:
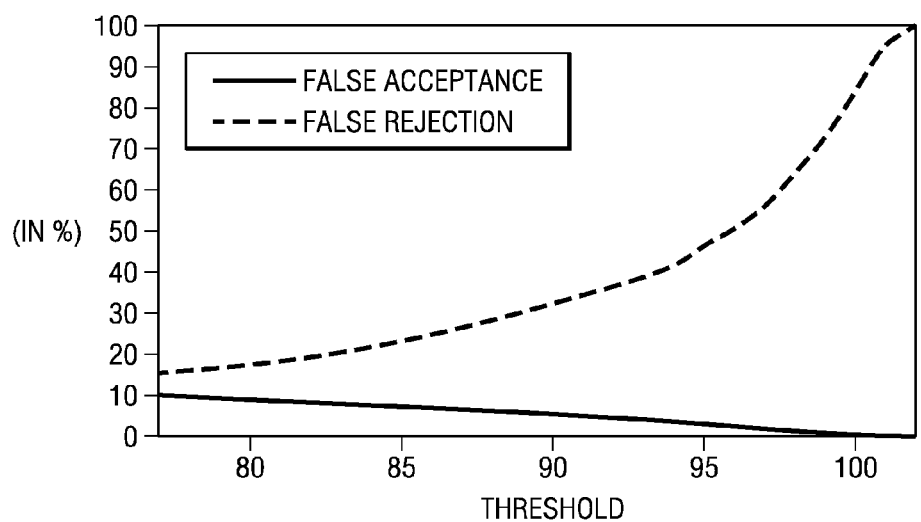
Figure 6:
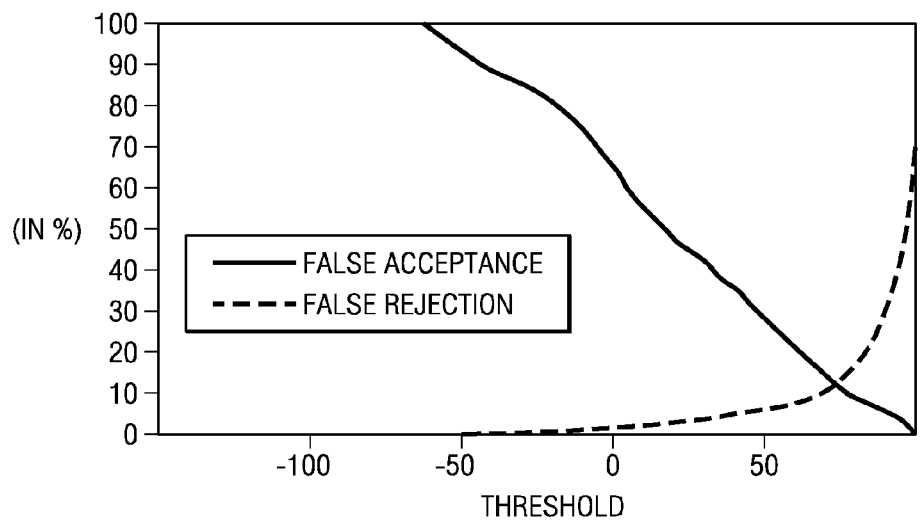

As an example, for the case of highway driving FIG. 3 plots the ROC curve; FIG. 4 shows the histogram of the confidence score Scr for correct (upper panel) and incorrect (lower panel) recognitions; FIG. 5 shows FA/FR as a function of threshold when FA is below 10%; and FIG. 6 shows FA/FR as a function of threshold when FR is below 10%. Note that the names recognized averaged about 8 to 20 phones per name because of using triphone models.

7. Modifications

The preferred embodiments can be modified while retaining one or more of the features of fused confidence scores.

For example, other UV features could be used in the confidence scores, such as the number of phones in a hypothesis $h_1 h_2 \ldots h_M$ with individual probabilities $P[h_j|O_j]$ greater than a threshold or the ratio of the hypothesized (best) phone probability to the second-best phone probability, and so forth.

What is claimed is:

1. A method of utterance verification in a mobile telephone, comprising the steps of:
   A. converting audible, voice utterances into sampled voice utterance signals;
   B. providing a first confidence score for a first recognition of an utterance based on the sampled voice utterance signals, the first confidence score for an utterance u relates to the ratio $G(f(u); \mu_c, \sigma_c)/G(f(u); \mu_e, \sigma_e)$ where:
      (i.) $G(.; \mu, \sigma)$ denotes a Gaussian with mean $\mu$ and standard deviation $\sigma$,
      (ii.) $f(.)$ denotes an utterance-verification feature,
      (iii.) $\mu_c, \sigma_c$ are mean and standard deviation derived from training on correctly recognized utterances, and
      (iv.) $\mu_e, \sigma_e$ are mean and standard deviation derived from training on incorrectly recognized utterances;
   C. providing a second confidence score for a second recognition, separate from the first recognition, of an utterance based on the sampled voice utterance signals;
   D. computing a decision score which includes the product of said first confidence score multiplied by said second confidence score;
   E. making an accept/reject decision for recognition of an utterance using the results of said computing a decision score; and
   F. performing a function in the mobile telephone in response to making an accept decision.

2. The method of claim 1, wherein said computing a decision score includes biasing said product of said first confidence score multiplied by said second confidence score.

3. The method of claim 1, wherein said utterance-verification feature value, f(u), for utterance u relates to $$\Sigma_{1 \leq i \leq M} \log\{P[O_i|h_i]\} - \Sigma_{1 \leq i \leq M} \log\{P[O_i]\}$$

where $O_1 \ldots O_i \ldots O_M$ are observation segments of utterance u with corresponding hypotheses $h_1 \ldots h_i \ldots h_M$ and where the approximation $$P[O_i] = \Pi_{1 \leq t \leq T_i} \{\max_{1 \leq m \leq W} P[o_{t,i}|h_m]\}$$

is used with $\{h_i: 1 \ldots W\}$ denoting the set of all possible hypotheses and $\{o_{t,i}: 1 \ldots T_i\}$ denoting observed frames constituting said observation segment $O_i$.

4. The method of claim 1, wherein said $\mu_c$ is updated after recognition of an utterance is accepted and said $\mu_e$ is updated after recognition of an utterance is rejected.

5. The method of claim 1 in which the performing a function includes effecting a call command in response to making an accept decision.

6. The method of claim 1 in which the performing a function includes effecting hands-free dialing in response to making an accept decision.

7. An utterance recognition system in a mobile telephone, comprising:
   A. a microphone receiving audible voice utterances and providing corresponding voice utterance signals;
   B. an integrated circuit data processor coupled with the microphone to process the voice utterance signals in accordance with stored instructions; and
   C. memory circuits storing the instructions, the instructions providing:
      (i) a recognizer coupled with the voice utterance signals and having an utterance output; and
      (ii) a verifier coupled to said recognizer, said verifier operable to:
      (a) provide a first confidence score for a first recognition of an utterance output by said recognizer, the first confidence score for an utterance a relates to the ratio $G(f(u); \mu_c, \sigma_c)/G(f(u); \mu_e, \sigma_e)$ where:
         (i.) $G(.; \mu, \sigma)$ denotes a Gaussian with mean $\mu$ and standard deviation $\sigma$,
         (ii.) $f(.)$ denotes an utterance-verification feature,
         (iii.) $\mu_c, \sigma_c$ are mean and standard deviation derived from training on correctly recognized utterances, and
         (iv.) $\mu_e, \sigma_e$ are mean and standard deviation derived from training on incorrectly recognized utterances;
      (b) provide a second confidence score for a second recognition of an utterance output by said recognizer;
      (c) compute a decision score which includes the product of said first confidence score multiplied by said second confidence score;
      (d) make an accept/reject decision for said recognition of an utterance using said decision score; and
      (e) perform a function in the mobile telephone in response to making an accept decision.

8. The mobile telephone of claim 7, wherein said utterance-verification feature value, f(u), for utterance u relates to $$\Sigma_{1 \leq i \leq M} \log\{P[O_i|h_i]\} - \Sigma_{1 \leq i \leq M} \log\{P[O_i]\}$$

where $O_1 \ldots O_i \ldots O_M$ are observation segments of utterance u with corresponding hypotheses $h_1 \ldots h_i \ldots h_M$ and where the approximation $$P[O_i] = \Pi_{1 \leq t \leq T_i} \{\max_{1 \leq m \leq W} P[o_{t,i}|h_m]\}$$

is used with $\{h_i: 1 \ldots W\}$ denoting the set of all possible hypotheses and $\{o_{t,i}: 1 \ldots T_i\}$ denoting observed frames constituting said observation segment $O_i$.

9. The mobile telephone of claim 7, wherein said $\mu_c$ is updated after recognition of an utterance is accepted and said $\mu_e$ is updated after recognition of an utterance is rejected.

* * * * *